US008578162B2

(12) United States Patent
Jentzsch et al.

(10) Patent No.: US 8,578,162 B2
(45) Date of Patent: Nov. 5, 2013

(54) UNIQUE IDENTIFIER, METHOD FOR PROVIDING THE UNIQUE IDENTIFIER AND USE OF THE UNIQUE IDENTIFIER

(76) Inventors: Rolf Jentzsch, Leipzig (DE); Dietmar Feustel, Panitzsch (DE); Brigit Topf, Schkeuditz (DE)

( * ) Notice: Subject to any disclaimer, the term of this patent is extended or adjusted under 35 U.S.C. 154(b) by 0 days.

(21) Appl. No.: 13/373,614

(22) Filed: Nov. 21, 2011

(65) Prior Publication Data

US 2012/0290841 A1 Nov. 15, 2012

Related U.S. Application Data

(63) Continuation of application No. PCT/EP2010/001356, filed on Mar. 4, 2010.

(30) Foreign Application Priority Data

May 20, 2009 (DE) .......................... 10 2009 022 233

(51) Int. Cl.
*G06F 21/00* (2006.01)

(52) U.S. Cl.
USPC ........................................................ 713/168

(58) Field of Classification Search
None
See application file for complete search history.

(56) References Cited

U.S. PATENT DOCUMENTS

| 5,517,567 | A * | 5/1996 | Epstein | 380/247 |
| 6,931,133 | B2 * | 8/2005 | Andrews et al. | 380/286 |
| 2002/0051537 | A1 | 5/2002 | Rogaway | |
| 2004/0187001 | A1 * | 9/2004 | Bousis | 713/175 |
| 2004/0193890 | A1 * | 9/2004 | Girault | 713/176 |
| 2005/0049979 | A1 * | 3/2005 | Collins et al. | 705/75 |
| 2005/0157871 | A1 * | 7/2005 | Komano et al. | 380/28 |
| 2006/0235805 | A1 | 10/2006 | Peng et al. | |
| 2009/0006513 | A1 | 1/2009 | Fischer et al. | |
| 2009/0097661 | A1 * | 4/2009 | Orsini et al. | 380/279 |
| 2010/0001840 | A1 * | 1/2010 | Kang et al. | 340/10.1 |
| 2010/0287375 | A1 * | 11/2010 | Lee | 713/171 |

FOREIGN PATENT DOCUMENTS

| DE | 102004008178 A1 | 9/2005 |
| DE | 102006031537 A1 | 6/2007 |
| DE | 102006040228 A1 | 3/2008 |
| DE | 102006040228 A1 | 3/2008 |
| DE | 102008033162 A1 | 1/2010 |
| EP | 1223705 A2 | 7/2002 |
| EP | 1465427 A1 | 10/2004 |
| EP | 1578053 A1 | 9/2005 |
| WO | WO9720266 | 6/1997 |
| WO | WO 2005024697 A2 | 3/2005 |
| WO | WO 2007113464 A1 | 10/2007 |
| WO | WO 2008148623 A1 | 12/2008 |

OTHER PUBLICATIONS

Applied Cryptography Protocols, Algorithms, and Source Code in C, Jun. 12, 1996.
Applied Cryptography Protocols, Algorithms and Source Code, Jun. 12, 1996.

* cited by examiner

*Primary Examiner* — Shaun Gregory
(74) *Attorney, Agent, or Firm* — Von Rohrscheidt Patents (57) ABSTRACT

A unique identifier which substantially prevents product counterfeiting, wherein the unique identifier can be produced in a very cost-effective manner. The unique identifier is suitable not only for use as a product identifier but also for authorization, for example for securing physical or electronic accesses, such as doors, computer programs or the like.

18 Claims, 5 Drawing Sheets

UNIQUE IDENTIFIER, METHOD FOR PROVIDING THE UNIQUE IDENTIFIER AND USE OF THE UNIQUE IDENTIFIER

RELATED APPLICATIONS

This application is a continuation of International application PCT/EP2010/001356 filed on Mar. 4, 2010 claiming priority from German application DE 10 2009 022 233.2 filed on May 20, 2009, both of which are incorporated in their entirety by this reference.

FIELD OF THE INVENTION

The present invention relates to a method for providing a unique identifier, using the unique identifier, the unique identifier itself and a device and a computer program product for performing the method.

BACKGROUND OF THE INVENTION

Product counterfeiting has become a significant factor in business. According to current reports, already ten percent of world trade is done through copies or counterfeits through product knock-offs, illegal surplus production, parallel or re-imports which cause damages internationally in a range of 300 billion Euros. In Germany, according to the German machine and equipment producers association, about two thirds of the manufactures of capital equipment are affected by product counterfeiting.

Product counterfeiting significantly affects the labor market, wherein 50,000 jobs are lost in Germany alone according to estimates by the ministry of justice due to product counterfeiting. In all of Europe as many as 300,000 jobs are affected.

Thus, capital equipment manufacturers are affected by product counterfeiting in particular, since they had to make substantial investments to develop, test, produce and advertize their quality products. A counterfeiter does not have to make these investments so that tagging on to the success of the original, he saves substantial cost and therefore has much higher profit margins, in particular when the counterfeit products are of inferior quality or the counterfeiter can sell at substantially lower prices.

Another downside is that manufacturers lose their reputation in the marketplace when counterfeits with inferior quality and safety enter the marketplace but are not immediately identifiable as counterfeits but are associated with the original manufacturers.

Another big problem besides the economic damages through products counterfeiting are the accidents and health risks that may be associated with counterfeit products. This is the case in particular when counterfeit products are not produced according to the same standards as the originals. This applies in particular to the drug industry, but also in other safety critical business areas like machinery and equipment, inferior counterfeit products can have significant consequences.

Thus it is an objective of capital equipment manufacturers to prevent product counterfeiting as far as possible. For this purpose, various protective technologies or technical safety devices like, for example, holograms, safety labels, micro color codes, digital watermarks and similar are developed, wherein the present emphasis is on developing product identifiers, whose features cannot be counterfeit.

For example, modern paper money uses a plurality of safety features intended to make counterfeiting impossible. Among these are, for example, Euro banknotes using special paper, optical safety features like watermarks, anti-copy grids, Melier fibers, safety threads, special dyes, iris printing, foil elements, holograms, micro-perforations, micro-lettering, fluorescent colors, optically variable ink, gloss effects, see-through windows, see-through registers, haptic safety features like paper feel and embossing and acoustic safety features regarding the sound of banknotes during crumpling or rubbing. Additionally, features are being used that are machine detectable like infrared dyes, magnetic elements, electric conductivity and similar.

A disadvantage of these product identifiers, however, is that their counterfeit safety is only provided as long as the product identifier has a technological edge over the counterfeiters which, however, typically is only temporary. Additionally, such multilayered product identifiers are rather expensive and can therefore only be effectively used for high-price products. Eventually, also a counterfeiting of particularly safe product identifiers cannot be completely prevented since it is very difficult for very complex product identifiers for a consumer and also for a seller to identify whether it is an original product identifier or a counterfeit.

BRIEF SUMMARY OF THE INVENTION

Thus, it is the object of the present invention to provide unique identifiers which substantially prevent product counterfeiting, wherein the unique identifier shall be producible in a cost-effective manner. In particular the unique identifier shall not only be suitable as a product identifier but shall also be suitable as a proof of authentication, for example, for securing physical or electronic access points like doors, computer programs and similar.

The object is achieved through the method for providing a unique identifier including providing a master key, generating a first random session key, and mixing the master key with the first random session key. The object is further achieved through using the unique identifier for product identification the master key and optionally the first and/or the second user key are stored at a checking device and it is being determined for checking the unique identifier for authenticity, whether the unique identifier is generatable using the stored master key and possibly the stored first and/or second user key. The object is further achieved through using the product identifier for authentication according including storing the master key and possibly the first and/or the second user key at a checking device associated with the access, providing the unique identifier through the person or the device seeking access, and determining through the checking device for checking the access authorization for the access, whether the unique identifier is generatable using the stored master key and optionally the stored first and/or second user key. The object is further achieved through the unique identifier being a bar code, in particular a one or two dimensional bar code or a surface structure or is arranged in an electronic memory, in particular in a RFID-chip. The object is further achieved through a computer program product stored on a computer readable medium, comprising computer readable program devices causing the computer to perform the method of the invention, in particular in combination with a use of the unique identifier of the invention, wherein the program devices are executed on the computer. Advantageous embodiments are provided in the dependent claims.

The inventors have found that making counterfeiting more difficult is a cost-effective and also futile path due to technical progress in order to prevent product counterfeiting or to secure authentications. Thus another path is proposed according to the invention to use the motivation of the counterfeiter, namely to reduce his profit far enough so that there is no reason for counterfeiting anymore. Thus in particular cases, product counterfeiting may still be possible, however the expenses for these large scale counterfeits are so high that there is no economic reason. Fraudulent authentication is thus rendered entirely impossible.

The method according to the invention for providing an unique identifier for an object like a product, an authentication for an access or similar is characterized in that it includes at least the following steps:
 (a) providing a master key;
 (b) generating a first random session key; and
 (c) mixing the master key with the first random session key.

Thus the object is achieved in that the unique identifier is generated through encryption, wherein a master key is provided and after generating a first random session key, the master key is mixed with the first random session key. Thus, for example, a manufacturer of capital equipment based on a single master key, for example, a physical random character sequence can provide numerous unique identifiers for products to be sold through first random session keys. Now, the manufacturer only has to store the first random session keys and thus may be able to notice which distribution path the product with the respective session key and the unique identifier generated there from has taken. A re-seller or consumer of the product can thus easily find out by calling a manufacturer hotline whether this is a unique product, wherein the consumer communicates the unique identifier to the manufacturer and the manufacturer checks whether this unique identifier can be generated with the predetermined master key and the stored session keys and whether a distribution path is associated with the used session key, wherein the distribution path corresponds to the distribution path which is stated by the re-seller or by the consumer.

Thus, a singular product counterfeit cannot be prevented since a unique identifier can certainly be copied in a simple manner, however large scale counterfeiting is quickly recognized since each unique identifier is only issued once. In particular for using the unique identifier for authentication, it can be advantageously provided in step (b) that the first random session key is provided to the user in an encrypted manner. Thus, the user can be a natural person or also a device or an arrangement. For encrypting the first random session key, a first user key is provided and the first random session key is mixed with the first user key. The first user key is thus tailored to the intended user and only this user or group of authorized users knows the first user key. The user then takes the assigned user key and determines the first random session key by de-mixing with his associated user key. When his user key matches with the first user key, then the user can determine the first random session key and can generate the unique identifier there from.

In a advantageous embodiment, it is provided that furthermore the following steps are being performed:
 (d) providing an object key; and
 (e) mixing the object key with the result of step (c), wherein preferably the result of step (c) or step (d) is reduced with a predetermined reduction algorithm to a length corresponding to the object key. Thus, it is provided that an object key is provided and the result of the mix of the first random session key and the master key is mixed with the object key. This way, information regarding the product can be added to each unique identifier, wherein the information is in particular information regarding the type, the amount, the distribution path and similar. In an advantageous embodiment it is provided that the length of the unique identifier is reduced to a length corresponding to the object key through a predetermined reduction algorithm. Independently from the object key, certainly also a result of mixing the master key with the first random session key can be reduced to a particular length through a predetermined reduction algorithm.

In another advantageous embodiment, it is provided that the following additional steps are being performed:
 (f) providing a second user key which is preferably identical with the first user key and which is characteristic for using the unique identifier, in particular characteristic for its user;
 (g) generating an identifier through mixing the first random session key and the second session key and;
 (h) combining the results of step (c) or step (e) and the identifier to form the unique identifier, wherein the identifier is preferably used in front of the result or after the result.

Thus, it is provided that a second user key is provided which is characteristic for using the unique identifier, in particular for its user, thus, for example, for the producer of the product.

Through the second user key which is preferably identical with the first user key, an identifier is generated through mixing the first random session key and the second user key. This identifier is then associated with the result of mixing the master key and the first random session key or mixing the master key, the first random session key and the object key to form the unique identifier. Thus preferably the identifier is placed in front or at the end, wherein however also predetermined mix algorithms can be used. This way, the manufacturer does not have to store the particular first random session keys anymore, but the used first random session key can be associated with any unique identifier through the second user key, wherein the second user key is known to the manufacturer. This facilitates determining whether the unique identifier is authentic and permissible with respect to the product, the authentication attempt or similar.

Advantageously the following additional steps are being performed:
 (i) the result from step (c) or (e) is divided into two partial lengths, wherein one partial length is mixed with the other partial length; and
 (j) the result from step (c) or (e) is mixed with the result from step (i).

Certainly also the other keys and/or mixing results can be modified. Thus the master key, the first user key, the second user key and/or the object key and/or the mixing results recited supra are modified further. This is provided preferably in that the first respective key or the respective mixing result is divided into two partial lengths and the one partial length is mixed with other partial lengths. This mixing result can then be mixed with the start value again. This further increases safety for the unique identifier.

In a particularly advantageous embodiment, the division into two partial lengths is provided in that one of the two partial lengths only includes character or bit sequences which are included in a provided second session key and the other of the two partial lengths only includes character or bit sequences which are not included in the second random session key. It is then particularly advantageous when the second random session key is identical with the first random session key. Thus, when using a user key storing the session keys can be omitted.

In an advantageous embodiment it is provided that at least for a mixing process, the mixing is provided as logical XOR-encoding or preferably as logically extended XOR-encoding.

Advantageously, the first random session key, the first user key, the second user key and/or the object key are >1 bit, advantageously a ≥24 bytes and particularly advantageously a ≥32 bytes.

It is furthermore advantageous when the master key is >100 bytes, more advantageously ≥1 MB and particularly advantageously ≥100 MB. Thus, the mixing cavity is very large, so that random matches of counterfeit unique identifiers can be excluded.

In particular with respect to the method steps when providing a unique identifier, performing the separation, mixing with logical XOR-encoding or a logically extended XOR-encoding, reference is made to DE 10 2009 022 233.2, whose content is incorporated by reference in its entirety in the instant application. DE 10 2009 022 233.2 thus describes a method for using a character sequence and the method can be used for the method for providing the unique identifier. All method steps of DE 10 2009 022 233.2 are therefore also applicable in the instant application and are thus part of the instant invention. By the same token also all advantages described in DE 10 2009 022 233.2 are advantages that are applicable to the present invention.

Independent patent protection is requested for using the unique identifier produced according to the invention for identifying a product or similar. Thus, the master key and possibly the user key are stored in a checking device and in order to check the unique identifier for authenticity, it is determined whether the unique identifier can be generated using the stored master key or the stored user key. In an advantageous embodiment of this use it is provided that it is being checked whether the object key used in the unique identifier matches with the quotation, distribution and/or sales attributes, etc. for the product. Thus, it is being checked whether the object key coincides with the distribution path determined for the product.

In a particularly advantageous manner, the product or similar is arranged in a packaging, wherein at least a first unique identifier is provided on the product itself or similar and at least a second unique identifier is provided on the packaging material, wherein the first unique identifier differs from the second unique identifier. This significantly increases counterfeiting safety since a counterfeiter now would have to counterfeit plural unique identifiers for a product.

Furthermore, independent patent protection is requested for using the unique identifier generated according to the invention for authenticating an access authorization for an access, in particular to a location, a vehicle, a program or similar. This use is characterized in that the master key and possibly the first and/or the second user key are deposited at a checking device that is associated with the access and the unique identifier is provided by the user requesting access, wherein it is determined by the checking device in order to check the access authorization for the access whether the unique identifier is generatable using the stored master key and optionally using the stored first and/or second user key.

In a particularly advantageous embodiment, it is provided that a first electronic device is associated with the user, wherein the master key is stored in the first electronic device and wherein a second electronic device is associated with the access, wherein the second electronic device generates the first random session key and transmits the session key or the result of a mixing of the first random session key and of the second random session key to the first electronic device associated with the user, wherein the first electronic device generates the unique identifier from the first random session key and the master key.

Furthermore independent patent protection is claimed for the unique identifier itself, which was produced according to the method according to the invention and which is configured as a barcode, in particular as a one-dimensional or two-dimensional barcode or a surface structure or which is arranged in an electronic memory or in an RFID chip.

Independent patent protection is claimed for a device configured for performing the method according to the invention.

The invention can be implemented as a complete hardware configuration, a complete software configuration or a configuration which includes hardware and also software. In an advantageous embodiment, the invention is implemented in software which includes firmware, system propriety software, microcode and similar, but is not limited thereto.

Furthermore, the invention can be implemented as a computer program product which is accessible through a computer usable or computer legible medium and provided through a program code for use through or in combination with a computer or any operating system. Therefore, independent patent protection is also claimed for a computer program product which is stored on a computer readable medium and includes computer readable program titles which cause the computer to execute the method according to the invention, when the program titles are executed on the computer.

For the purpose of this description, computer useable or computer readable media can be all devices which include, store, communicate, spread or transport the program for use through or in combination with the command execution system, the device or the arrangement.

The medium can be an electronic, magnetic, optical, electromagnetic, infrared or semi-conductor system (or a device or an arrangement) or a propagation medium. Examples for a computer readable medium include a semi-conductor or solid state memory, a magnetic tape, a removable computer disc, a random access memory (RAM), a read-only memory (ROM), a magnetic hard-disc or an optical disc. Present embodiments of optical discs include compact disc read-only memory (CD ROM), compact disc-read-write (CD-R/W) and DVD.

A data processing system that is configured to store and/or execute the program code, includes at least one processor which is directly or indirectly connected with at least one storage medium through a system bus. The storage element can include a local memory which becomes active during the current execution of the program code, mass storage and buffer memories which provides temporary storage of at least some program codes to reduce the number of call-ups of the code from the mass storage during execution.

Input/output or I/O devices which can include keyboards, displays, indicators, etc. but which are not limited thereto can be coupled to the system either directly or through I/O controllers connected there between.

Network adapters can also be connected with the system in order to facilitate that the data processing system is coupled with other data processing systems or remote printers or storage devices through intermediary connected private or public networks. Modems, cable modems or Ethernet cards in this context are only a few examples of the presently available types of network adapters.

BRIEF DESCRIPTION OF THE DRAWINGS

The features of the present invention and additional advantages are now described based on advantageous embodiments with reference to drawing figures, wherein.

DETAILED DESCRIPTION OF THE INVENTION

The alphanumeric character sequences and barcodes illustrated in the subsequently described figures are only provided in an exemplary manner for illustrative purposes. They do not follow the recited mixing algorithms.

Figure 1:
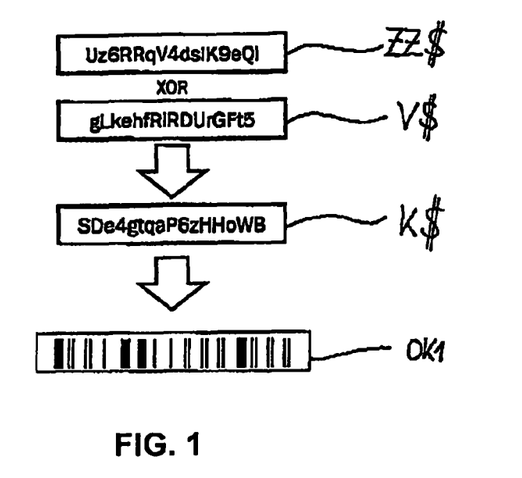
FIG. 1 illustrates a first advantageous embodiment for generating the first portion of the unique identifier.

FIG. 1 schematically illustrates a production of the first portion OK1 of the unique identifier OK according to a first advantageous embodiment. It is evident that the first random session key ZZ$ is mixed with a user key V$ through an XOR encoding to generate an identifier key K$. The identifier key K$ is subsequently converted in a one-dimensional barcode which forms the first portion OK1 of the unique identifier OK according to the invention.

Figure 2A:
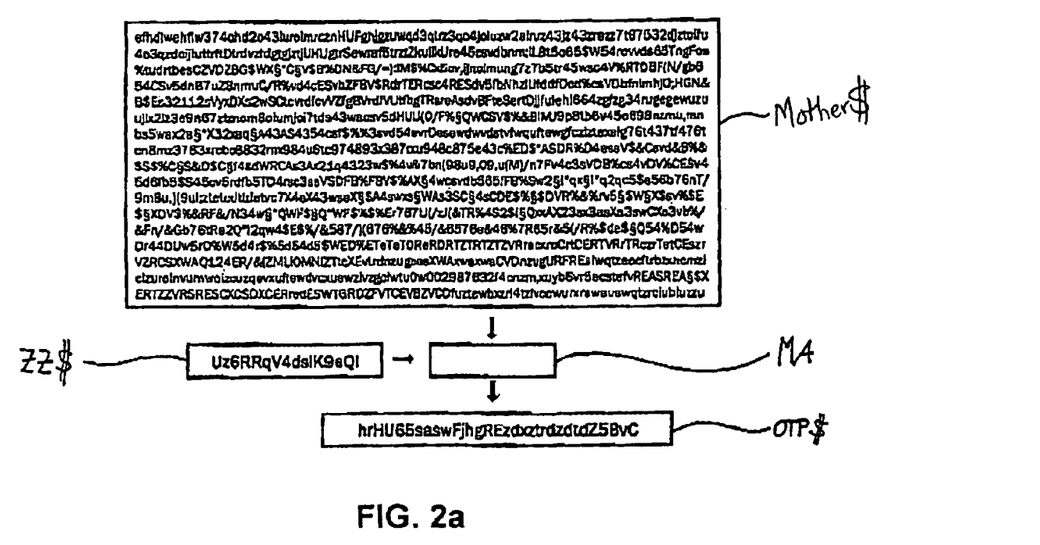
FIGS. 2a, 2b illustrate a first advantageous embodiment for generating the second portion of the identifier.
Figure 2B:
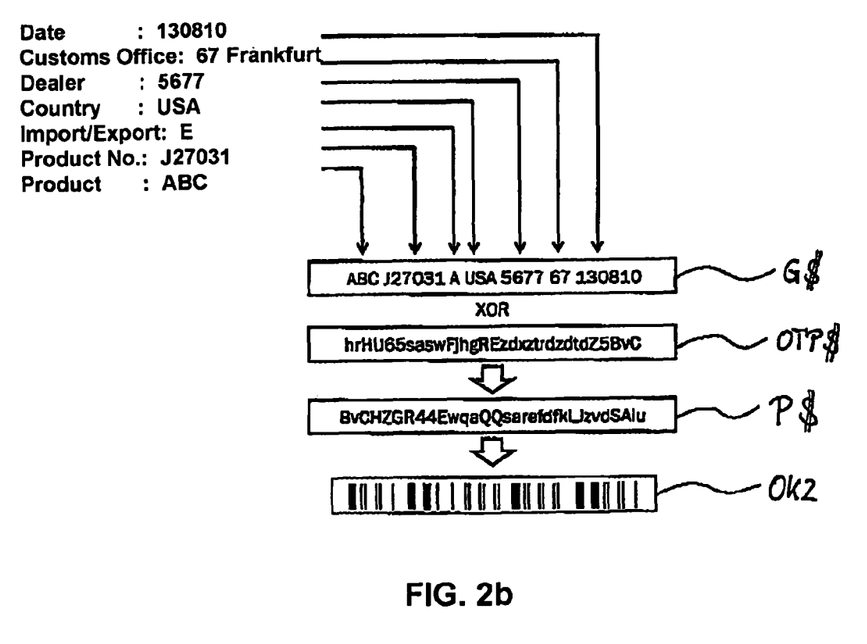

FIGS. 2a and 2b schematically illustrate the generation of the second portion OK2 of the unique identifier OK according to a first advantageous embodiment. It is evident that the master key Mother$ is mixed with the first random session key ZZ through a particular mixing algorithm MA in order to form a one-time-pad key OTP$.

As apparent from FIG. 2b, the one-time-pad key OTP$ is mixed with an object key G$ through logical XOR encoding which generates a product key P$. Also this product key P$ is converted into a one-dimensional barcode and forms the second portion OK2 of the unique identifier OK.

In this advantageous embodiment, the master key Mother$ has a size of 100 MB, the user key V$ and also the first random session key ZZ$ have a size of 16 byte.

Figure 3:
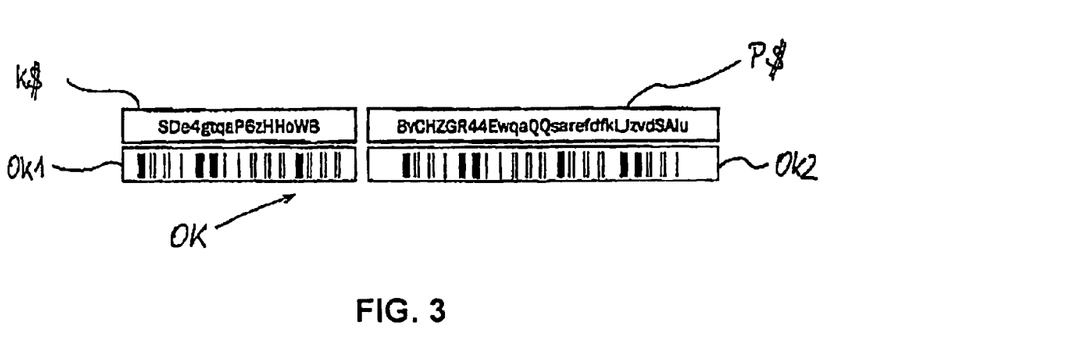
FIG. 3 illustrates the unique identifier generated from the first portion according to FIG. 1 and the second portion according to FIGS. 2a, 2b.

The unique identifier OK itself is then formed in that the first portion OK1 of the unique identifier OK is placed in front of the second portion OK2 of the unique identifier OK and this yields a uniform barcode OK as illustrated in FIG. 3. The two portions OK1, OK2 of the unique identifier OK can thus be illustrated spatially offset as illustrated in FIG. 3 or can also be illustrated directly transitioning into one another so that no separation is visible.

Figure 4:
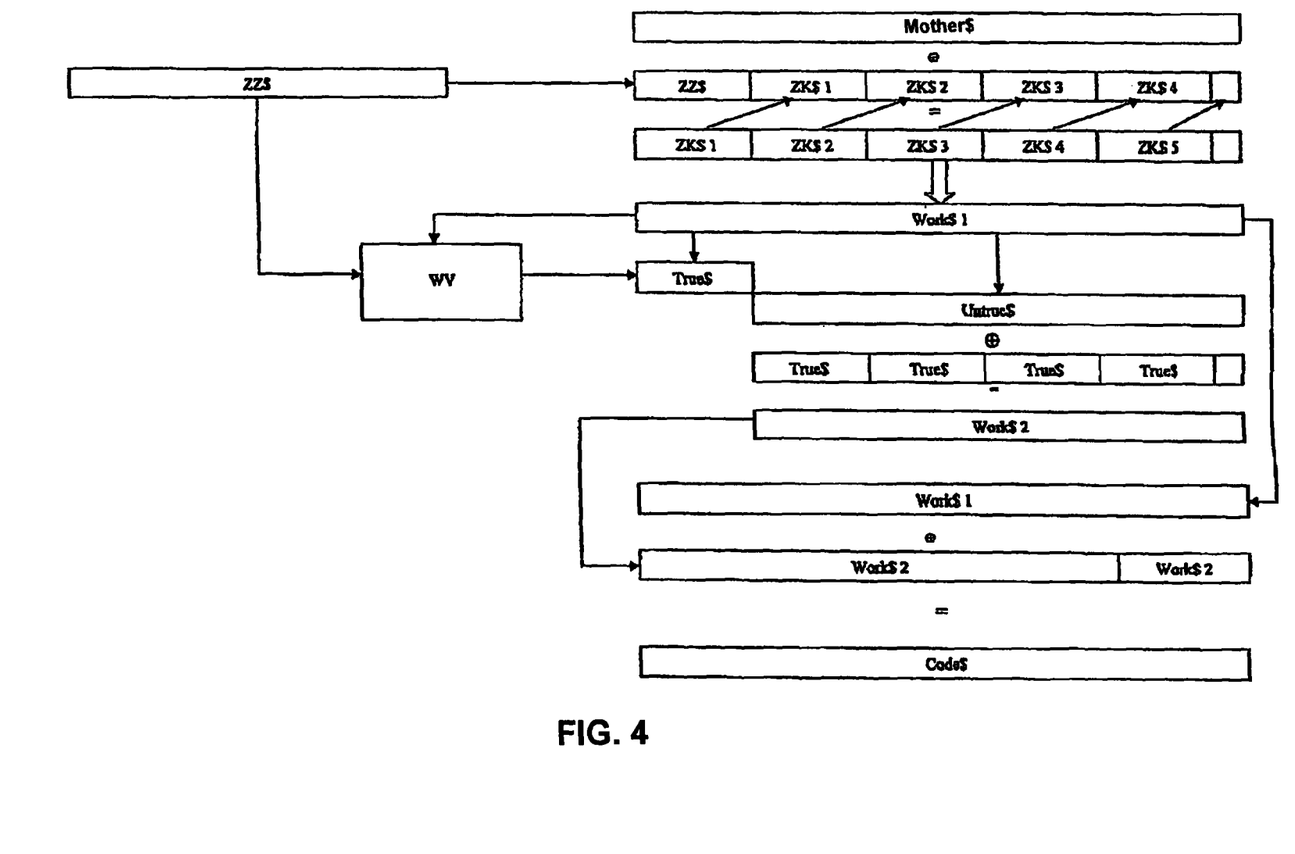
FIG. 4 illustrates the mixing algorithm used when generating the third portion of the unique identifier according to FIG. 2.
Figure 5:
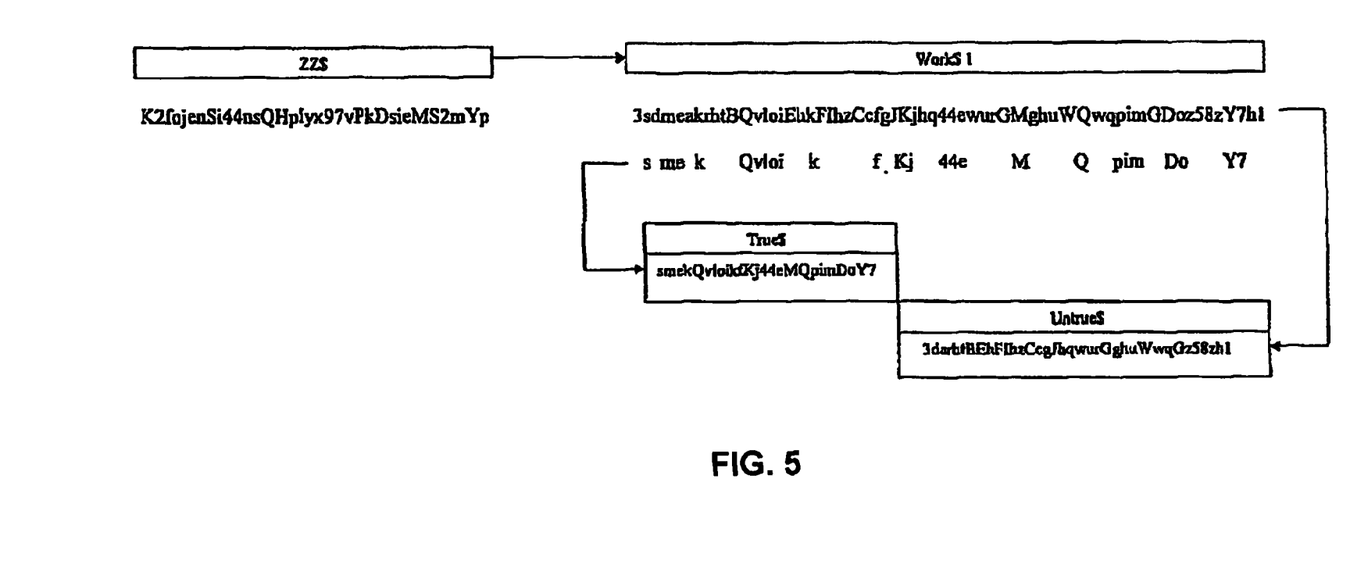
FIG. 5 illustrates the division algorithm used in the mixing algorithm according to FIG. 3.

FIG. 4 schematically illustrates the mixing algorithm MA used in the advantageous embodiment according to FIG. 2a wherein FIG. 5 schematically illustrates the separation algorithm WV used in the mixing algorithm. The session key ZZ$ is only illustrated in an exemplary manner and does not correspond to the session key ZZ$ used in FIG. 1, 2a, 2b since FIG. 5 shall only describe the principle of the separation algorithm WV.

FIG. 4 schematically illustrates that the master key Mother$ is logically extended with the first random session key ZZ$ and XOR encoded. This is performed in that the first 16 byte of the master key Mother$ are logically XOR encoded with the session key ZZ$ which generates a first partial string ZK$1 as a result which also has a length of 16 byte. This first partial string ZK$1 is in turn used to encode a second portion of the master key Mother$ XOR. Thus, the next 16 byte of the session key Mother$ are being used and a second partial string ZK$ 2 is generated as a result which in turn is used for the XOR encoding of the next 16 byte of the master key Mother$. This procedure as indicated in FIG. 4 is repeated until the entire 100 MB of the master key Mother$ have been used.

The concatenation of the partial strings ZK$ 1, ZK$ 2, ZK$ 3, ZK$ 4, ZK$ 5 and so forth yields the first character string WORK$ 1 as a result which has a length of 100 MB like the master key Mother$.

The first character string Work$ 1 is separated according to the separation algorithm described in more detail in FIG. 5 into two partial lengths, true$, untrue$ and subsequently both partial lengths true$, untrue$ are XOR encoded together. This is performed in that the shorter partial length in the present embodiment true$ is concatenated until its length corresponds at least to the longer partial length in the instant example untrue$. As a result a second character sequence work$ 2 is created which has the length of the longer partial length untrue$.

Certainly instead of an XOR encoding of the two partial lengths true$, untrue$ alternatively an extended XOR encoding can be provided to further reduce the ability to decode the master key Mother$.

Subsequently the first character sequence Work$ 1 is logically XOR encoded with the second character sequence Work$ 2, wherein in turn the second character sequence Work$ 2 is concatenated until its length corresponds to the length of the first character sequence Work$ 1. As a result a code key code$ is generated which in turn includes the length of the main key Mother$, thus 100 MB.

From this code key Code$ the one time pad key OTP$ which has a size of 32 byte is generated through size reduction. This size reduction is provided in that the code key code$ generated in the mixing algorithm is reduced through a particular reduction algorithm from 100 MB to 32 bytes. This can be preformed, for example, in that the first 32 bytes are selected out of the 100 MB. However, also other reduction algorithms are useable as long as they are defined in a reproducible manner.

FIG. 5 schematically illustrates the separation algorithm WV of FIG. 4 in a schematic diagram. Thus, it is being compared in the context of the separation algorithm WV, which characters included in the session key ZZ$ are also included in the first character sequence work$ 1. The characters which are included in the first character sequence work$ 1 are stored in the first partial length true$ in the sequence which is predetermined in the session key ZZ$. On the other hand side the characters of the first character sequence work$ 1 which are not included in the session key ZZ$ are stored in the second partial length untrue$ in the sequence which is predetermined in the first character sequence Work$ 1. This mixing algorithm additionally prevents backward computation which could otherwise be possible for simple XOR encoding under particular instances. Certainly also another sequence can be selected when producing the partial lengths true$ and untrue$.

The keys Mother$, ZZ$, V$, G$, P$ are alpha numerical character strings including letters, numbers and special characters, wherein alternatively certainly also purely binary character sequences can be used.

In the present embodiment the user key V$ stands for the name of a particular manufacturer. The object key G$ used in FIG. 2b includes a plurality of information as illustrated in more detail in FIG. 2b. In this embodiment it is illustrated that the object keys G$ include information regarding the manufacturing date, the customs office designated for export, thus in the instant case Frankfurt, the distributor in the receiving country, the receiving county, whether it is an export or an import, the product number and the product name. Certainly also here other information regarding the product can be deposited.

The unique identifier OK thus produced is now applied to the product, wherein, for example, a first unique identifier OK is provided on the common drug packaging and another different unique identifier OK is provided on each blister included in the packaging.

The first portion OK1 of the unique identifier OK thus identifies the manufacturer of the drug and provides indications regarding the first random session key ZZ\$ that has been used. The second portion OK2 in turn includes product information and facilitates back tracing to the manufacturer.

Both portions OK1, OK2 of the unique identifier OK have common and unmistakable properties. There occurrence as a pair OK1, OK2 is unique in this form. Additionally this pair OK1, OK2 only has validity for one manufacturer. The product information encoded in the second portion OK2 of the unique identifier OK is a onetime pad and thus absolutely counterfeit proof. Thus, the pairs OK1, OK2 can be generated in real time at the manufacturer and do not show any statistic features which would facilitate encryption. The random space $\Omega$ for generating the unique identifier OK has the size $\Omega = 2^{384}$ which assures that a plurality of products can be provided with a unique identifier OK without changing the master key Mother\$ without repetitions of the unique identifier OK occurring. Another essential advantage is that the pair OK, OK1 once generated and thus the unique identifiers OK do not have to be stored at any point in time since the manufacturer knows his own user key V\$ and can thus compute back to the first random session key ZZ\$ and the manufacturer can thus and through its stored master key Mother\$ compute back from the second portion OK2 of the unique identifier OK to the object key G\$ in order to determine whether the object key G\$ is useful at all and can also be associated with the product, namely, for example, with respect to its distribution path.

As stated supra, plural unique identifiers OK can be applied to the product, namely, for example, a first unique identifier OK on the packaging, a second unique identifier OK that is different there from on the blister and where required also a third different unique identifier OK on the instruction sheet included with the medicine. Since these are different unique identifiers OK, the counterfeit becomes even more difficult for the counterfeiter.

Based on an embodiment, it will be subsequently emphasized why it does not make sense for a counterfeiter to counterfeit unique identifiers, for example, for drugs. In the example a shipment of drugs with the name of ABC shall be shipped into Congo, wherein the shipment includes 4,000 packages of the drug. Each package includes different unique identifiers OK and furthermore additional unique identifiers are provided on the included blisters and on the instruction leaflet. When only one blister is included per package, then 1,200 different unique identifiers OK are included in the shipment.

A counterfeiter who wants to sell one counterfeit shipment of this drug in the marketplace now would have different options. Thus, he could apply no unique identifier OK at all. This however would be detected in customs immediately. Then, such shipments could immediately be confiscated.

Furthermore, he could apply a pure fantasy identifier instead of the unique identifier OK. The counterfeit would be detected after decoding. Thus, either customs could ask the manufacturer for assistance, wherein the manufacturer then calculates back whether the applied unique identifiers OK make sense. Alternatively, customs can also be provided with particular deciphering devices by the manufacturer, wherein the deciphering devices include the master key Mother\$ which is secured against readout and optionally the user key V\$ that is also secured against readout. Thus, it can be directly checked in customs whether the codes are counterfeit.

Furthermore, the counterfeiters can obtain a few authentic unique identifiers OK and can apply them to the shipment at will. This would have the consequence that it would be determined when checking the unique identifiers OK after a few samples that identical unique identifiers OK are provided which, however, cannot be the case so that these have to be counterfeits. Also on the other side the object key G\$ included in the unique identifiers OK will not coincide, for example, with the distribution properties of the product.

Eventually, the counterfeiter can, for example, also obtain 3,000 unique identifiers OK and apply them. In this case, however, the product information would not be correct in the object identifier G\$, since, for example, the production date which is included in the object key G\$ would not correspond to the minimum shelf life date and similar. Furthermore, obtaining a large number of unique identifiers OK would cause very high cost for the counterfeiter so that obtaining large numbers of unique identifiers OK does not make sense economically. Furthermore, a counterfeit of this type would also be detected in that the same product would be sold several times with the same product number which in turn is not possible either.

The unique identifiers OK according to the invention have another advantage. In case all unique identifiers OK and furthermore also the products themselves are authentic, it would immediately become evident that this is an illegal re-import, since the object key G\$ is not correct with respect to the information regarding export or import.

It is essential that the unique identifier according to the invention cannot only be used for products like drugs, spare parts or similar, but also for documents, certificates, official seals, for example, official inspection seals and similar. The product information is not limited to object keys G\$ of 32 bytes and the user keys V\$ are not limited to 16 bytes but can at the most have the same size as the main key Mother\$, thus in the present case have a size of 100 MB, wherein the master key Mother\$ can certainly also have any larger size. This only depends from the available computing capacity.

It is a particular advantage of the unique identifier OK according to the invention that the method for producing the unique identifier OK is a very fast method and the unique identifier OK can be provided in a very cost-effective manner, for example, through a simple print. Alternatively, the unique identifier can also be stored electronically, for example, in a RFID chip, a RAM, a ROM or similar.

Additionally, the method is very flexible and the unique identifiers OK can be changed any time in that the product information is changed in the product key P\$, the user key V\$ and/or the master key Mother\$. Furthermore, the information on which the unique identifier OK is based is not visible to anyone, only the unique identifier OK itself is visible.

The unique identifiers OK that are being used can easily be queried from the manufacturer itself or through manufacturer authorized reading devices which do not pose a safety risk since the master keys Mother\$ and user keys V\$ which are included in the reading devices cannot be read out which necessitates taking suitable measures.

Querying the unique identifier OK can be performed, for example, through a handy in that a photo is taken of the unique identifier OK and transmitted to the manufacturer. A manufacturer could also provide a control option for his unique identifier OK on the internet.

It is furthermore essential that not only counterfeiting within a legal distribution path is prevented, but smuggled merchandise is also safely identified as counterfeit.

Figure 6:
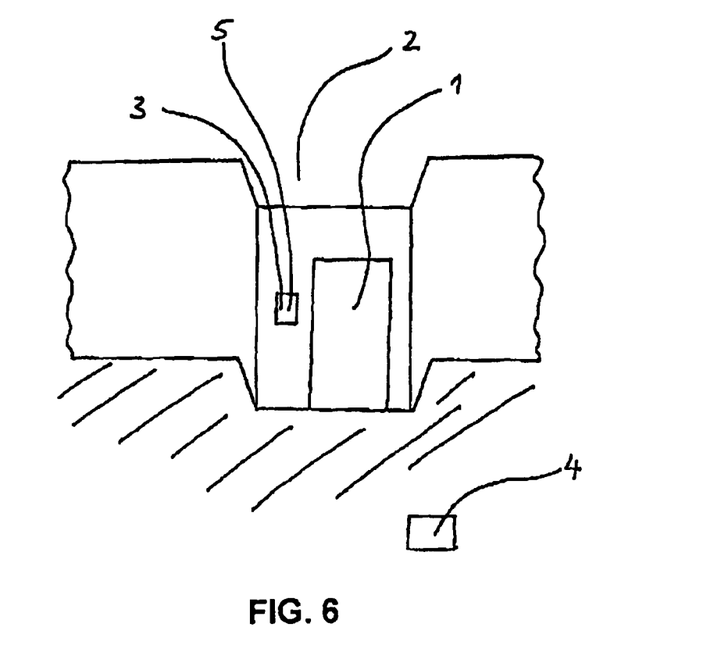
FIG. 6 illustrates using the unique identifier according to the invention for authenticating an access.
Figure 7:
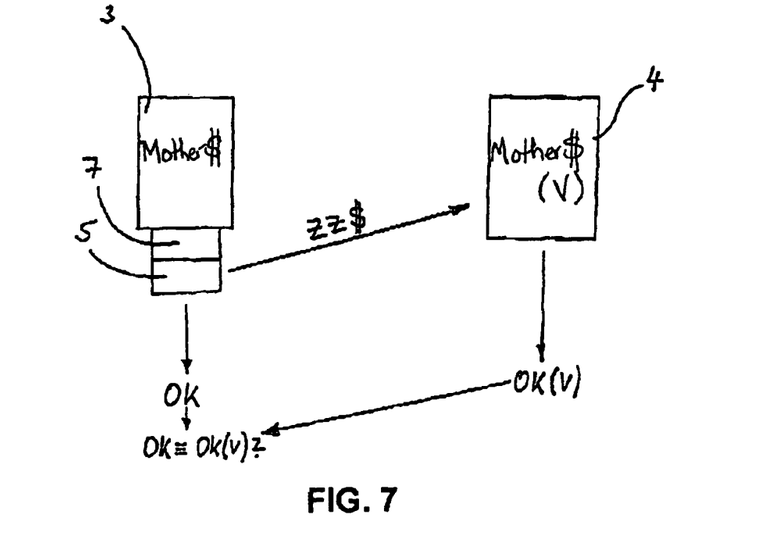
FIG. 7 illustrates a second advantageous embodiment for generating a unique identifier that is used in the application according to FIG. 6.

In a second advantageous embodiment according to FIGS. 6 and 7, the unique identifier according to the invention is used for authorizing the access permit for an access 1 to a secure area 2. The access in this case is a door 1 which can be opened after respective authorization through a user (not illustrated) in order to gain access to the secure area 2, wherein the secure area 2, for example, is a teller area of a bank or similar.

A checking device 3 is associated with the access 1, wherein the checking device checks an authentication process of the user and releases the access 1 for the user when the authentication is successful. The user uses a first electronic device 4 for performing the authentication process, wherein the device is configured so that it can communicate with a second electronic device 5 which is associated with the checking device 3. The first and the second electronic devices 4, 5 thus, for example, include radio transmitting and receiving devices and similar.

FIG. 6 illustrates the authentication process in a purely schematic manner. The checking device 3 and also the first electronic device 4 include the master key Mother$ which is, for example, stored in a ROM and secured against an unauthorized readout attempt. For example, the checking device 3 includes a random source which is, for example, configured as random number generator 7.

After the user has contacted the checking device 3 through the electronic device 4, the checking device 3 provides a session key ZZ$ through the random number generator 7, wherein the checking device transmits the session key ZZ$ to the first electronic device 4. The first electronic device 4 generates a unique identifier OK (V) from the stored master key Mother$ and the session key ZZ$, according to the method according to the invention, wherein V in this case stands for the user. The unique identifier OK (V) is communicated to the checking device 3. The checking device 3 also generates a unique identifier OK from the master key Mother$ that is also stored and the transmitted session key ZZ$ according to the method according to the invention.

Subsequently, the checking device 3 determines whether the proprietary generated unique identifier OK is identical with the unique identifier OK(V) transmitted by the first electronic device 4. When this is the case, the checking device 3 releases the access 1 for the user. In case there is no match, the checking device 3 does not open the access 1 and it can optionally be provided that an alarm is immediately triggered and/or the user is optically registered.

In case plural different authorized users are provided for the access 1, it can be helpful not to communicate the session key ZZ$ itself to the first electronic device 4, but to encrypt the session key ZZ$ through a user key V$ and/or an object key G$ and to communicate this encrypted result to the first electronic device 4. Thus, the first electronic device 4 would communicate at the beginning of an authentication process to the checking device 3 through a provided code which user demands access to the access 1 and the checking device 3 would use the respective user key for encrypting the session key ZZ$.

Only when the first electronic device 4 includes the identical user key V$ and/or the object key G$, the first electronic device 4 can tune the random session key ZZ$ through de-mixing and thus generate the required unique identifier OK (V) through the master key Mother$(V).

In all cases in which the first electronic device does not have the correct master key Mother$(V) which is identical with the master key Mother$ stored in the checking device 3 and optionally the user key V$ and/or the object key G$ does not match with the user key V$ and/or the object key G$ stored in the checking device 3 for the user, no successful authentication takes place and the access 1 remains closed for the user since the generated unique identifier OK, OK (V) are not identical.

Alternatively it can also be provided that the session key ZZ$ is not transmitted to the first electronic device 4 in an encrypted manner, but that a user key V$ and/or an object key G$ is stored in the first electronic device 4 and thus the unique identifier OK (V) is generated through the method according to the invention. In this case, the checking device 3 in which all access authorized user keys V$ or object keys G$ are stored would compute all possible unique identifiers OK and check whether the transmitted unique identifier OK (V) is identical with one of these optional unique identifiers OK and open the access 1.

At present, the random source 7 is associated with the checking device 3. Alternatively it can certainly also be provided that the random source 7 is associated with the first electronic device 4 and the session key ZZ$ generated therewith is transmitted to the checking device 3 according to which the checking device 3 and also the first electronic device 4 respectively generate the unique identifier OK, OK(V) and the checking device 3 determines whether there is a match.

In the described embodiment, the access 1 is a door to a secured area 2 which is e.g. arranged in a house. Alternatively it can certainly also be provided that it is an access to an automobile, wherein the first electronic device 4 is then integrated in a remote entry system.

Independently from such purely physical accesses 1, it can also be a pure information access or electronic access, for example, an access to secured structures of a data processing system or a secured software area on a data processing system.

Also all other types of accesses can be secured against unauthorized access through the unique identifier OK according to the invention and the method according to the invention for generating the unique identifier.

When describing advantageous embodiments, it was presumed that the random source is a random number generator 7. Alternatively, certainly also any other type of random source can be used. Random sources of this type can be, for example, the surface properties, in particular roughnesses of particular surfaces. On the other hand side, also particular color values of a surface or of an object can be used for generating a random number or contrast conditions are being used.

The unique identifier OK does not have to be stored or transmitted as alphanumerical character sequence, barcode or similar, or as binary code either. Alternatively, the unique identifier OK can also be embodied as a mono-dimensional or two-dimensional color or contrast value, a hologram or through particular colors or similar, possibly also invisibly.

With respect to generating the master key Mother$ and the session key ZZ$ in order to provide them for the method, reference is made to the German patent application DE 10 2008 033 162 which is incorporated in its entirety by this reference. This patent application describes in detail how random numbers with extremely high statistic quality can be generated as physical random numbers. Alternatively, these keys Mother$, ZZ$ can also be cost-effectively produced as pseudo-random numbers.

It is important for the method according to the invention for generating the unique identifier OK and the unique identifier OK, according to the invention and the use of the unique identifier, that this is based on a one-time pad that is generatable in a particularly simple and efficient manner which provides that also, for example, when intercepting the session key ZZ$ during access authorization, non-authorized users cannot perform the authorization since they cannot determine the master key.

Contrary to the unique identifier OK according to the invention, prior art product identifiers were counterfeitable to a large extent because they are not unique. And for the case that the product identifier includes a plurality of safety features a counterfeit could only be determined through specially trained experts.

With the unique identifier each product can be associated with a unique identifier OK and a checking for uniqueness is not only reserved for specially trained experts but can be performed easily at the manufacturers through a hot line or similar or through manufacturer authorized equipment in customs or similar devices without additional training.

It has become apparent from the description provided supra that the present invention provides a unique identifier which substantially prevents product counterfeiting wherein the unique identifier can be produced in a very cost effective manner. The unique identifier according to the invention is thus not only suitable for use as product identifiers but also as a proof of authentication, for example, when securing spatial or electronic accesses like doors, computer programs and similar.

What is claimed is:

1. A method for providing a unique identifier for an object like a product, an authorization for an access or similar, comprising the steps:
   a) providing a master key;
   b) generating a first random session key; and
   c) mixing the master key with the first random session key;
   d) providing an object key; and
   e) mixing the object key with the result of step c)
   i) dividing the result of step c) or e) into two partial lengths, wherein one partial length is mixed with the other partial length; and
   j) mixing the result of step c) or step e) with the result of step i);
   wherein one of the two partial lengths only includes character or bit sequences which are included in a provided second random session key and the other of the two partial lengths only includes character or bit sequences which are not included in the second random session key,
   wherein in particular the first random session key and the second random session key are provided as identical random session keys, and
   wherein the unique identifier or the master key are in a readable medium.

2. The method according to claim 1, wherein step b) includes the steps:
   assigning a first user key to a user;
   mixing the first random session key and the first user key;
   providing the mixed first random session key to the user; and
   determining the first random session key at the user through de-mixing the mixed first random session key through the first user key.

3. The method according to claim 2 further comprising the steps:
   f) providing a second user key which is identical with the first user key and which is characteristic for using the unique identifier;
   g) generating an identifier through mixing the first random session key and the second user key; and
   h) combining the results of step c) or step e) and the identifier to form the unique identifier,
   wherein the identifier is placed in front or after the result.

4. The method according to claim 1, wherein the mixing is performed as logical XOR encoding.

5. The method according to claim 3, wherein the first random session key, the second random session key, the first user key, the second user key or the object key are provided greater than 1 bit, or the master key is provided greater than 100 bytes.

6. A method for using a unique identifier according to claim 3 for characterizing a product or similar,
   wherein the master key and optionally the first or the second user key are stored at a checking device and it is being determined for checking the unique identifier for authenticity, whether the unique identifier is generatable using the stored master key and possibly the stored first or second user key.

7. The method according to claim 6, including the step of: checking whether the object key used in the unique identifier matches quotation, distribution or sales characteristics for the product or similar.

8. The method according to claim 6,
   wherein the product or similar is arranged in a package,
   wherein at least a first unique identifier is provided on the product or similar, and
   wherein at least a second unique identifier which differs from the first unique identifier is provided on the packaging.

9. The method of using the unique identifier according to claim 3 for authenticating the access authorization for the access, in particular to an area, a vehicle and similar, further comprising the steps:
   storing the master key and possibly the first or the second user key at a checking device associated with the access;
   providing the unique identifier through the person or the device seeking access, and
   determining through the checking device for checking the access authorization for the access, whether the unique identifier is generatable using the stored master key and optionally the stored first or second user key.

10. The method according to claim 9,
    wherein at least the steps a) and c) are performed in a first electronic device which is associated with the access seeking person or access seeking device, and
    wherein a second electronic device associated with the access performs step b) and transmits the session key or the result of mixing the first random session key and the second user key for performing step c) to the first electronic device.

11. The unique identifier generated according to the method according to claim 1, wherein the unique identifier is a bar code or a surface structure or is arranged in an electronic.

12. A computer program product stored on a computer readable medium, comprising computer readable program devices causing the computer to perform a method according to claim 1, wherein the program devices are executed on the computer.

13. The method according to claim 1, wherein the result of step c) or step d) is reduced to a length corresponding to the object key through a predetermined reduction algorithm.

14. The method according to claim 2, further comprising the steps:
- f) providing a second user key which is identical with the first user key and which is characteristic for the user of the first user key;
- g) generating an identifier through mixing the first random session key and the second user key; and
- h) combining the results of step c) or step e) and the identifier to form the unique identifier, wherein the identifier is placed in front or after the result.

15. The method according to claim 1, wherein the mixing is performed as logically extended XOR encoding.

16. The method according to claim 3, wherein the first random session key, the second random session key, the first user key, the second user key and the object key are provided ≥24 bytes, and the master key is provided greater than 1 megabyte.

17. The method according to claim 6, including the step of:
- checking whether the object key used in the unique identifier matches a distribution path determined for the product.

18. The method according to claim 1, wherein the readable medium is one of a bar code, a surface structure, electronic memory, or a computer usable or computer legible medium.

* * * * *

UNITED STATES PATENT AND TRADEMARK OFFICE
CERTIFICATE OF CORRECTION

PATENT NO. : 8,578,162 B2  
APPLICATION NO. : 13/373614  
DATED : November 5, 2013  
INVENTOR(S) : Jentzsch et al.

Page 1 of 2

It is certified that error appears in the above-identified patent and that said Letters Patent is hereby corrected as shown below:

On Title Page

Item (76) Inventor: delete "Brigit Topf" and insert -- Birgit Topf -- as shown on the attached page.

Signed and Sealed this
Fourth Day of February, 2014

Michelle K. Lee
*Deputy Director of the United States Patent and Trademark Office*

(12) United States Patent
Jentzsch et al.

(10) Patent No.: US 8,578,162 B2
(45) Date of Patent: Nov. 5, 2013

(54) UNIQUE IDENTIFIER, METHOD FOR PROVIDING THE UNIQUE IDENTIFIER AND USE OF THE UNIQUE IDENTIFIER

(76) Inventors: Rolf Jentzsch, Leipzig (DE); Dietmar Feustel, Panitzsch (DE); Birgit Topf, Schkeuditz (DE)

(*) Notice: Subject to any disclaimer, the term of this patent is extended or adjusted under 35 U.S.C. 154(b) by 0 days.

(21) Appl. No.: 13/373,614

(22) Filed: Nov. 21, 2011

(65) Prior Publication Data
US 2012/0290841 A1    Nov. 15, 2012

Related U.S. Application Data

(63) Continuation of application No. PCT/EP2010/001356, filed on Mar. 4, 2010.

(30) Foreign Application Priority Data

May 20, 2009  (DE) .................... 10 2009 022 233

(51) Int. Cl.
*G06F 21/00* (2006.01)
(52) U.S. Cl.
USPC ............................................. 713/168
(58) Field of Classification Search
None
See application file for complete search history.

(56) References Cited

U.S. PATENT DOCUMENTS

| | | | |
|---|---|---|---|
| 5,517,567 A * | 5/1996 | Epstein | 380/247 |
| 6,931,133 B2 * | 8/2005 | Andrews et al. | 380/286 |
| 2002/0051537 A1 | 5/2002 | Rogaway | |
| 2004/0187001 A1 * | 9/2004 | Bousis | 713/175 |
| 2004/0193890 A1 * | 9/2004 | Girault | 713/176 |
| 2005/0049979 A1 * | 3/2005 | Collins et al. | 705/75 |
| 2005/0157871 A1 * | 7/2005 | Komano et al. | 380/28 |
| 2006/0235805 A1 | 10/2006 | Peng et al. | |
| 2009/0006513 A1 | 1/2009 | Fischer et al. | |
| 2009/0097661 A1 * | 4/2009 | Orsini et al. | 380/279 |
| 2010/0001840 A1 * | 1/2010 | Kang et al. | 340/10.1 |
| 2010/0287375 A1 * | 11/2010 | Lee | 713/171 |

FOREIGN PATENT DOCUMENTS

| | | |
|---|---|---|
| DE | 102004008178 A1 | 9/2005 |
| DE | 102006031537 A1 | 6/2007 |
| DE | 102006040228 A1 | 3/2008 |
| DE | 102006040228 A1 | 3/2008 |
| DE | 102008033162 A1 | 1/2010 |
| EP | 1223705 A2 | 7/2002 |
| EP | 1465427 A1 | 10/2004 |
| EP | 1578053 A1 | 9/2005 |
| WO | WO9720266 | 6/1997 |
| WO | WO 2005024697 A2 | 3/2005 |
| WO | WO 2007113464 A1 | 10/2007 |
| WO | WO 2008148623 A1 | 12/2008 |

OTHER PUBLICATIONS

Applied Cryptography Protocols, Algorithms, and Source Code in C, Jun. 12, 1996.
Applied Cryptography Protocols, Algorithms and Source Code, Jun. 12, 1996.

* cited by examiner

*Primary Examiner* — Shaun Gregory
(74) *Attorney, Agent, or Firm* — Von Rohrscheidt Patents (57) ABSTRACT

A unique identifier which substantially prevents product counterfeiting, wherein the unique identifier can be produced in a very cost-effective manner. The unique identifier is suitable not only for use as a product identifier but also for authorization, for example for securing physical or electronic accesses, such as doors, computer programs or the like.

18 Claims, 5 Drawing Sheets